(12) United States Patent
Kashida et al.

(10) Patent No.: US 7,211,353 B2
(45) Date of Patent: May 1, 2007

(54) NON-AQUEOUS ELECTROLYTIC SOLUTION AND SECONDARY BATTERY

(75) Inventors: Meguru Kashida, Annaka (JP); Satoru Miyawaki, Annaka (JP); Mikio Aramata, Annaka (JP); Shoji Ichinohe, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 11/278,267

(22) Filed: Mar. 31, 2006

(65) Prior Publication Data

US 2006/0223940 A1    Oct. 5, 2006

(30) Foreign Application Priority Data

Apr. 4, 2005    (JP)    ............................. 2005-107444

(51) Int. Cl.
*H01M 10/08* (2006.01)
*C09J 7/00* (2006.01)

(52) U.S. Cl. .................. 429/313; 156/313; 252/62.2
(58) Field of Classification Search ............... 429/313; 156/313; 252/62.2
See application file for complete search history.

(56) References Cited

U.S. PATENT DOCUMENTS 5,538,812 A * 7/1996 Lee et al. .................. 429/307
6,124,062 A * 9/2000 Horie et al. ................ 429/324
6,589,383 B1 * 7/2003 Takaoka et al. ............ 156/313
6,858,351 B2 * 2/2005 Miura et al. ............... 429/317
6,872,493 B2 * 3/2005 Yamada et al. ............. 429/313
6,902,850 B2 * 6/2005 Wariishi et al. ............ 429/317
2006/0046150 A1 * 3/2006 Kashida et al. ............ 429/302
2006/0083992 A1 * 4/2006 Nakanishi et al. ......... 429/324
2006/0223940 A1 * 10/2006 Kashida et al. ............ 524/588

FOREIGN PATENT DOCUMENTS

| JP | 11-214032   | 8/1999 |
| JP | 2000-58123  | 2/2000 |
| JP | 2001-110455 | 4/2001 |
| JP | 2003-142157 | 5/2003 |

* cited by examiner

*Primary Examiner*—Mark Ruthkosky
(74) *Attorney, Agent, or Firm*—Oblon, Spivak, McClelland, Maier & Neustadt, P.C.

(57) ABSTRACT

A non-aqueous electrolytic solution is provided comprising a non-aqueous solvent, an electrolyte salt, and a siloxane-modified polyoxyalkylene compound having (poly)organosiloxane structures at both ends of polyoxyalkylene. A secondary battery using the same has improved temperature characteristics and high-output characteristics.

4 Claims, No Drawings

NON-AQUEOUS ELECTROLYTIC SOLUTION AND SECONDARY BATTERY

CROSS-REFERENCE TO RELATED APPLICATION

This non-provisional application claims priority under 35 U.S.C. §119(a) on Patent Application No. 2005-107444 filed in Japan on Apr. 4, 2005, the entire contents of which are hereby incorporated by reference.

TECHNICAL FIELD

This invention relates to a lithium ion secondary battery capable of charge/discharge operation by migration of lithium ions between positive and negative electrodes, and more particularly, to a non-aqueous electrolytic solution for use therein comprising a non-aqueous solvent, an electrolyte salt, and a siloxane-modified polyoxyalkylene compound having (poly)organosiloxane structures at both ends of polyoxyalkylene, and a battery using the same. The secondary battery using the electrolytic solution of the invention has improved temperature characteristics and high-output characteristics.

BACKGROUND ART

Because of their high energy density, lithium ion secondary batteries are increasingly used in recent years as portable power sources for laptop computers, mobile phones, digital cameras and the like. Also great efforts are devoted to the development of lithium ion secondary batteries as power sources for electric automobiles which are desired to reach a practically acceptable level as environment-friendly automobiles.

The lithium ion secondary batteries, albeit their high performance, are not satisfactory with respect to discharge characteristics in a rigorous environment, especially low-temperature environment, and discharge characteristics at high output levels requiring a large quantity of electricity within a short duration of time. Most batteries use electrolytic solutions based on low-flash-point solvents, typically dimethyl carbonate and diethyl carbonate. In case of thermal runaway in the battery, there is a risk of ignition. An improvement in safety is desired.

Reference should be made to JP-A 11-214032, JP-A 2000-58123 both corresponding to U.S. Pat. No. 6,124,062, JP-A 2001-110455, and JP-A 2003-142157.

SUMMARY OF THE INVENTION

An object of the present invention is to provide a non-aqueous electrolytic solution which enables construction of a battery, especially a non-aqueous electrolyte secondary battery, having improved discharge characteristics both at low temperatures and at high outputs as well as improved safety, and a secondary battery using the same.

The inventors have discovered that when a non-aqueous electrolytic solution comprising a siloxane-modified polyoxyalkylene compound having (poly)organosiloxane structures at both ends of polyoxyalkylene as represented by formula (1) below is used in a secondary battery, the battery is improved in discharge characteristics both at low temperatures and at high outputs and in safety.

Specifically, the present invention provides a non-aqueous electrolytic solution comprising a non-aqueous solvent, an electrolyte salt, and a siloxane-modified polyoxyalkylene compound as essential components. The siloxane-modified polyoxyalkylene compound is one in which a silicon atom of siloxane is bonded to each end of polyoxyalkylene via a linkage structure in the form of an alkylene chain such as —$C_3H_6$— or —$CH_2CH(CH_3)CH_2$— as represented by formula (1) below.

The present invention also provides a secondary battery comprising a positive electrode, a negative electrode, a separator, and an electrolytic solution which is the non-aqueous electrolytic solution defined above.

Herein $R^1$ is each independently an alkylene group of 2 to 6 carbon atoms, a is an integer of 2 to 4, b is an integer of 1 to 6, and A is a group of the formula (2):

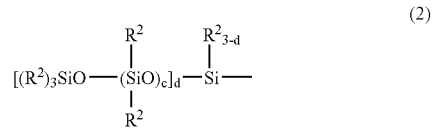

wherein $R^2$ is each independently an alkyl, cycloalkyl, aryl or aralkyl group of 1 to 10 carbon atoms, which may be substituted with halogen, c is an integer of 0 to 6, and d is 1 or 2.

BENEFITS OF THE INVENTION

The battery using a non-aqueous electrolytic solution comprising a siloxane-modified polyoxyalkylene compound having formula (1) has improved temperature characteristics and high-output characteristics.

DESCRIPTION OF THE PREFERRED EMBODIMENTS

The siloxane-modified polyoxyalkylene compound used in the non-aqueous electrolytic solution of the invention is a compound in which the oxygen atom at each end of polyoxyalkylene is bonded to the terminal silicon atom of a linear or branched (poly)organosiloxane structure of 2 to 15 silicon atoms, preferably 2 to 8 silicon atoms, more preferably 2 to 4 silicon atoms, via an alkylene chain such as —$C_3H_6$— or —$CH_2CH(CH_3)CH_2$— chain as represented by formula (1), i.e., an A-B-A block structure oligomer consisting of [siloxane block]-[polyoxyalkylene block]-[siloxane block].

The siloxane-modified polyoxyalkylene compound ensures more smooth migration of lithium ions along the electrode surface and between electrodes via a separator, probably because it is more compatible with an electrolyte salt due to the inclusion of polyoxyalkylene group and possesses a siloxane bond having better wettability.

Herein $R^1$ is each independently an alkylene group of 2 to 6 carbon atoms, a is an integer of 2 to 4, b is an integer of 1 to 6, and A is a group of the formula (2):

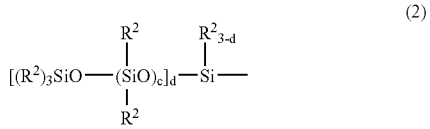
(2)

wherein $R^2$ is each independently an alkyl, cycloalkyl, aryl or aralkyl group of 1 to 10 carbon atoms, preferably 1 to 8 carbon atoms, which may be substituted with halogen, c is an integer of 0 to 6, preferably 0 to 3, more preferably 0 to 2, most preferably 0 or 1, and d is 1 or 2.

Of the oxyalkylene ($C_aH_{2a}O$) moieties, ethylene oxide and propylene oxide are preferred for quality and cost.

Examples of the alkylene represented by $R^1$ include $—C_2H_4—$, $—C_3H_6—$, $—CH_2CH(CH_3)CH_2—$, $—(CH_2)_4—$ and $—(CH_2)_6—$.

Examples of $R^2$ include methyl, ethyl, propyl, isopropyl, butyl, isobutyl, tert-butyl, pentyl, cyclopentyl, hexyl, cyclohexyl, octyl, phenyl, tolyl, xylyl, benzyl, phenylethyl, etc., and substituted forms of the foregoing groups in which one or more hydrogen atoms are substituted by halogen atoms (e.g., fluorine), such as chloromethyl, bromoethyl, trifluoromethyl, and 3,3,3-trifluoropropyl.

Illustrative, non-limiting examples of the siloxane-modified polyoxyalkylene compound having formula (1) are given below.

alkylene having alkenyl groups (e.g., vinyl or allyl) at opposite ends. For example, the siloxane-modified polyoxyalkylene compound having formula (3) can be obtained through addition reaction of a siloxane having formula (11):

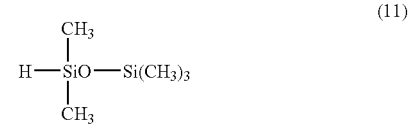
(11)

as the SiH group-containing siloxane and a polyoxyethylene having formula (12):

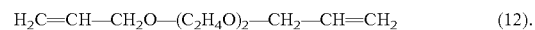
(12).

Desirably the addition reaction is effected in the presence of a platinum or rhodium catalyst. Suitable catalysts used herein include chloroplatinic acid, alcohol-modified chloroplatinic acid, and chloroplatinic acid-vinyl siloxane complexes. Further a co-catalyst such as sodium acetate or sodium citrate may be added. The catalyst is used in a catalytic amount, and preferably such that platinum or rhodium is present in an amount of up to 50 ppm, more preferably up to 20 ppm, relative to the total weight of the SiH group-containing siloxane and the alkenyl end-capped polyoxyalkylene.

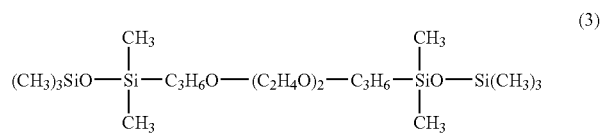
(3)

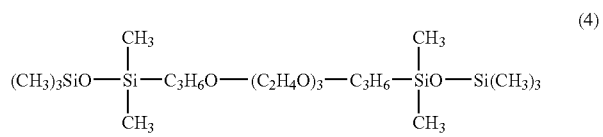
(4)

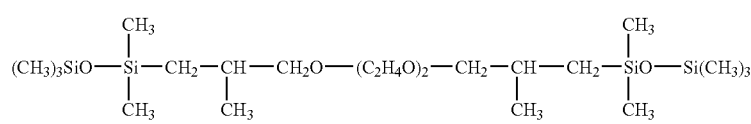
(5)

(6)

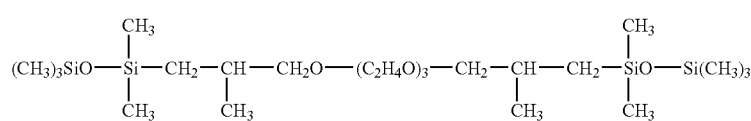
(7)

(8)

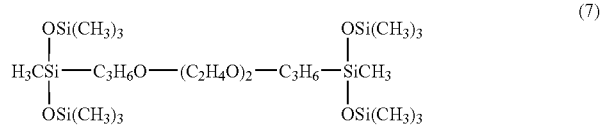
(9)

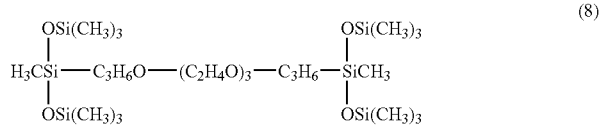

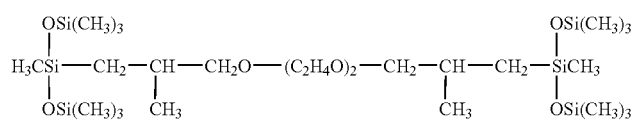
(10)

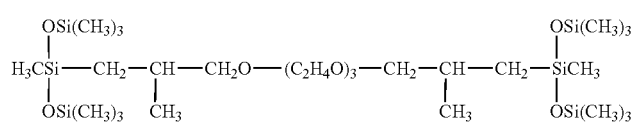

The siloxane-modified polyoxyalkylene compound having formula (1) can be obtained through addition reaction of a preselected siloxane having a hydrogen atom bonded to a silicon atom (i.e., SiH group) and a preselected polyoxy- If desired, the addition reaction may be effected in an organic solvent. Suitable organic solvents include aliphatic alcohols such as methanol, ethanol, 2-propanol and butanol; aromatic hydrocarbons such as toluene and xylene; aliphatic or alicyclic hydrocarbons such as n-pentane, n-hexane, and cyclohexane; and halogenated hydrocarbons such as dichloromethane, chloroform and carbon tetrachloride.

Addition reaction conditions are not particularly limited. Typically addition reaction is effected under reflux for about 1 to 10 hours.

In the non-aqueous electrolytic solution, the siloxane-modified polyoxyalkylene compound having formula (1) should preferably be present in an amount of at least 0.001% by volume. If the content of siloxane-modified polyoxyalkylene is less than 0.001% by volume, the desired effect may not be exerted. The preferred content is at least 0.1% by volume. The upper limit of the content varies with a particular type of solvent used in the non-aqueous electrolytic solution, but should be determined such that migration of Li ions within the non-aqueous electrolytic solution is at or above the practically acceptable level. The content is usually up to 80% by volume, preferably up to 60% by volume, and more preferably up to 50% by volume of the non-aqueous electrolytic solution.

No particular limit is imposed on the viscosity of the siloxane-modified polyoxyalkylene compound having formula (1). For smooth migration of Li ions within the non-aqueous electrolytic solution, the compound should preferably have a viscosity of up to 100 mm$^2$/s, more preferably up to 50 mm$^2$/s, as measured at 25° C. by a Cannon-Fenske viscometer. The lower limit of viscosity is usually at least 0.1 mm$^2$/s, though not critical.

The non-aqueous electrolytic solution of the invention further contains an electrolyte salt and a non-aqueous solvent.

The electrolyte salt used herein is not particularly limited as long as it can serve as an electrolyte. Most often, lithium metal salts are used, for example, $LiPF_6$, $LiBF_4$, $LiClO_4$, $LiSbF_6$, $LiCF_3SO_3$, $LiN(CF_3SO_2)_2$, and $LiC(CF_3SO_2)_3$. These salts may be used in admixture. From the electric conductivity aspect, the electrolyte salt is preferably present in a concentration of 0.5 to 2.0 mole/liter of the non-aqueous electrolytic solution.

The non-aqueous solvent used herein is not particularly limited as long as it can serve for the non-aqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propionate, methyl acetate, tetrahydrofuran, and dimethoxyethane. It is desirable to use a mixture of an aprotic high-dielectric-constant solvent and an aprotic low-viscosity solvent in a proper ratio.

If desired, various additives may be added to the non-aqueous electrolytic solution of the invention. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid compounds, nitrogen- and sulfur-containing compounds for acid removal and water removal purposes.

Another embodiment of the present invention is a secondary battery, especially a non-aqueous electrolytic solution secondary battery, comprising a positive electrode, a negative electrode, a separator, and an electrolytic solution, wherein the non-aqueous electrolytic solution described above is used as the electrolytic solution.

The components other than the electrolytic solution may be the same as in well-known secondary batteries. The material of which the positive electrode is made is preferably a complex oxide of lithium and a transition metal such as cobalt, manganese or nickel. Examples include $LiCoO_2$, $LiMnO_2$ and $LiNiO_2$. Part of the transition metal may be replaced by another metal such as Fe, Si, Zn, Cu, Mg, Ga, Ti, Al, Cr, and V. These positive electrode materials may be used in admixture.

The material of which the negative electrode is made is not particularly limited as long as it is capable of occluding and releasing lithium. Generally used are carbonaceous materials such as graphite, metals such as silicon and tin, oxides of such metals, lithium metal, and lithium alloys. These negative electrode materials may be used in admixture.

Any desired method may be used in the preparation of positive and negative electrodes. Electrodes are generally prepared by adding an active material, binder, conductive agent and the like to a solvent to form a slurry, applying the slurry to a current collector sheet, drying and press bonding. The binder used herein is usually selected from polyvinylidene fluoride, polytetrafluoroethylene, styrene-butadiene rubber, isoprene rubber, and various polyimide resins. The conductive agent used herein is usually selected from carbonaceous materials such as graphite and carbon black, and metal materials such as copper and nickel. As the current collector, aluminum and aluminum alloys are usually employed for the positive electrode, and metals such as copper, stainless steel and nickel and alloys thereof employed for the negative electrode.

The separator disposed between the positive and negative electrodes is not particularly limited as long as it is stable to the electrolytic solution and holds the solution effectively. The separator is most often a porous sheet or non-woven fabric of polyolefins such as polyethylene and polypropylene.

The battery may take any desired shape. In general, the battery is of the coin type wherein electrodes and a separator, all punched into coin shape, are stacked, or of the cylinder type wherein electrode sheets and a separator are spirally wound.

EXAMPLE

Examples of the present invention are given below for further illustrating the invention, but they are not construed as limiting the invention thereto. The viscosity (mm$^2$/s) is measured at 25° C. by a Cannon-Fenske viscometer.

Example 1

[Synthesis of Siloxane-Modified Polyoxyethylene, i.e., Polyoxyethylene Having Siloxane Added at Both Ends]

The siloxane-modified polyoxyethylene having formula (3) was synthesized as follows.

A reactor equipped with a stirrer, thermometer and reflux condenser was charged with 100 g of allyl end-capped polyoxyethylene having formula (12), 100 g of toluene, and 0.05 g of a solution of 0.5 wt % chloroplatinic acid in isopropyl alcohol (IPA). With stirring at 100° C., 138 g of pentamethyldisiloxane having formula (11) was added dropwise to the mixture. Reaction took place while the molar ratio of terminal unsaturated groups to SiH groups was about 1.0. The reaction solution was precision distilled in vacuum, obtaining the siloxane-modified polyoxyethylene, i.e., polyoxyethylene having siloxane added at both ends, represented by formula (3). It had a viscosity of 10.1 mm²/s and a purity of 99.7% as analyzed by gas chromatography.

[Preparation of Non-Aqueous Electrolytic Solution]

A non-aqueous electrolytic solution was prepared by dissolving 10.0% by volume of the siloxane-modified polyoxyethylene having formula (3) in 45.0% by volume of ethylene carbonate and 45.0% by volume of diethyl carbonate and further dissolving $LiPF_6$ therein in a concentration of 1.0 mole/liter.

[Preparation of Battery Materials]

The positive electrode material used was a single layer sheet using $LiCoO_2$ as the active material and an aluminum foil as the current collector (trade name Pioxcel C-100 by Pionics Co., Ltd.). The negative electrode material used was a single layer sheet using graphite as the active material and a copper foil as the current collector (trade name Pioxcel A-100 by Pionics Co., Ltd.). The separator used was a glass fiber filter (trade name GC-50 by Advantec Toyo Kaisha, Ltd.).

[Battery Assembly]

A battery of 2032 coin type was assembled in a dry box blanketed with argon, by stacking the positive electrode material, separator and negative electrode material on a stainless steel can housing also serving as a positive electrode conductor, feeding the electrolytic solution, closing the opening with a stainless steel sealing plate also serving as a negative electrode conductor and an insulating gasket, and fastening and securing them tight.

[Battery Test (Low-Temperature Characteristics)]

The steps of charging (up to 4.2 volts with a constant current flow of 0.6 mA) and discharging (down to 2.5 volts with a constant current flow of 0.6 mA and at a discharge rate of 0.15 C) at 25° C. were repeated 10 cycles, after which similar charging/discharging steps were repeated at 5° C. Provided that the discharge capacity at the 10th cycle at 25° C. is 100, the number of cycles repeated until the discharge capacity at 5° C. lowered to 80 was counted.

For comparison purposes, a battery of 2032 coin type was assembled using a non-aqueous electrolytic solution not containing the siloxane-modified polyoxyethylene, and similarly tested.

As a result, the battery with the siloxane-modified polyoxyethylene-containing non-aqueous electrolytic solution marked 205 cycles whereas the battery with the non-aqueous electrolytic solution not containing the siloxane-modified polyoxyethylene marked 85 cycles.

[Battery Test (High-Output Characteristics)]

The steps of charging (up to 4.2 volts with a constant current flow of 0.6 mA) and discharging (down to 2.5 volts with a constant current flow of 0.6 mA and at a discharge rate of 1.25 C) at 25° C. were repeated 5 cycles, after which similar charging/discharging steps in which the charging conditions were kept unchanged, but the discharging current flow was increased to 5 mA were repeated 5 cycles. These two types of charging/discharging operation were alternately repeated. Provided that the discharge capacity at the 5th cycle in the initial 0.6 mA charge/discharge operation is 100, the number of cycles repeated until the discharge capacity lowered to 80 was counted.

For comparison purposes, a battery of 2032 coin type was assembled using a non-aqueous electrolytic solution not containing the siloxane-modified polyoxyethylene, and similarly tested.

As a result, the battery with the siloxane-modified polyoxyethylene-containing non-aqueous electrolytic solution marked 152 cycles whereas the battery with the non-aqueous electrolytic solution not containing the siloxane-modified polyoxyethylene marked 93 cycles.

Examples 2 to 5

In Example 2, the same siloxane-modified polyoxyethylene as in Example 1 was used in a different proportion. In Examples 3 to 5, other siloxane-modified polyoxyethylenes as listed in Table 1 were used. The battery performance was examined as in Example 1. The results are shown in Table 1 together with those of Example 1 and Comparative Example. Note that Comparative Example (CE) used no siloxane-modified polyoxyethylene.

TABLE 1

| | Electrolytic solution formulation (vol %) | | | Siloxane-modified polyoxyethylene | | Battery performance | |
|---|---|---|---|---|---|---|---|
| | EC | DEC | Siloxane-modified polyoxyethylene | Chemical structure | Viscosity (mm²/s) | Low-temperature test (cycles) | High-temperature test (cycles) |
| Example 1 | 45.0 | 45.0 | 10.0 | formula (3) | 10.1 | 205 | 152 |
| Example 2 | 42.5 | 42.5 | 15.0 | formula (3) | 10.1 | 188 | 139 |
| Example 3 | 45.0 | 45.0 | 10.0 | formula (4) | 15.6 | 193 | 145 |
| Example 4 | 45.0 | 45.0 | 10.0 | formula (5) | 8.8 | 201 | 148 |
| Example 5 | 45.0 | 45.0 | 10.0 | formula (7) | 18.3 | 177 | 143 |
| Comparative Example | 50.0 | 50.0 | 0.0 | — | — | 85 | 93 |

EC: ethylene carbonate
DEC: diethyl carbonate

Japanese Patent Application No. 2005-107444 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A non-aqueous electrolytic solution comprising a non-aqueous solvent, an electrolyte salt, and a siloxane-modified polyoxyalkylene compound having the formula (1):

   (1)

wherein $R^1$ is each independently an alkylene group of 2 to 6 carbon atoms, a is an integer of 2 to 4, b is an integer of 1 to 6, and A is a group of the formula (2):

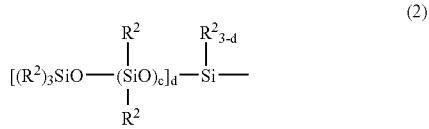   (2)

wherein $R^2$ is each independently an alkyl, cycloalkyl, aryl or aralkyl group of 1 to 10 carbon atoms, which may be substituted with halogen, c is an integer of 0 to 6, and d is 1 or 2.

2. The non-aqueous electrolytic solution of claim 1 wherein the siloxane-modified polyoxyalkylene compound is present in an amount of at least 0.001% by volume.

3. The non-aqueous electrolytic solution of claim 1 wherein the electrolyte salt is a lithium metal salt.

4. A secondary battery comprising a positive electrode, a negative electrode, a separator, and an electrolytic solution, said electrolytic solution being the non-aqueous electrolytic solution of claim 1.

* * * * *